(12) United States Patent
Kristensen et al.

(10) Patent No.: US 12,733,623 B2
(45) Date of Patent: Sep. 15, 2026

(54) DEVICE FOR ESTIMATING AT LEAST ONE PROPERTY OF FODDER, A KIT, A CONTAINER COMPRISING THE DEVICE, AND A METHOD FOR ESTIMATING AT LEAST ONE PROPERTY OF FODDER

(71) Applicant: SEGES INNOVATION P/S, Aarhus (DK)

(72) Inventors: Niels Bastian Kristensen, Tjele (DK); Claus Bertram Marcussen, Skive (DK)

(73) Assignee: SEGES INNOVATION P/S, Aarhus N (DK)

( * ) Notice: Subject to any disclaimer, the term of this patent is extended or adjusted under 35 U.S.C. 154(b) by 737 days.

(21) Appl. No.: 18/022,579

(22) PCT Filed: Aug. 25, 2021

(86) PCT No.: PCT/EP2021/073519
§ 371 (c)(1),
(2) Date: Sep. 1, 2023

(87) PCT Pub. No.: WO2022/043384
PCT Pub. Date: Mar. 3, 2022

(65) Prior Publication Data

US 2023/0413781 A1 Dec. 28, 2023

(30) Foreign Application Priority Data

Aug. 25, 2020 (EP) .................................... 20192771

(51) Int. Cl.
*A01K 5/02* (2006.01)
*G01N 21/3563* (2014.01)
*G01N 21/85* (2006.01)

(52) U.S. Cl.
CPC .......... *A01K 5/0275* (2013.01); *A01K 5/0258* (2013.01); *G01N 21/3563* (2013.01); *G01N 21/85* (2013.01); *G01N 2021/8592* (2013.01)

(58) Field of Classification Search
CPC ............... A01K 5/0275; A01K 5/0258; G01N 21/3563; G01N 21/3554; G01N 21/3581; G01N 21/359
See application file for complete search history.

(56) References Cited

U.S. PATENT DOCUMENTS 4,563,581 A 1/1986 Perten
6,020,588 A 2/2000 Ditmarsen et al.
(Continued)

FOREIGN PATENT DOCUMENTS

CN 206851690 U 1/2018
DE 2359854 A1 6/1975
(Continued)

OTHER PUBLICATIONS

Twickler, et al., "Sensor controlled total-mixed-ration for nutrient optimized feeding of dairy cattle", XVI International Silage Conference 2012 Finland, Jan. 1, 2012, pp. 2-4.
(Continued)

*Primary Examiner* — Casey Bryant
(74) *Attorney, Agent, or Firm* — Dinsmore & Shohl LLP

(57) ABSTRACT

A device for estimating at least one property of fodder includes a screw at least partially installed in a cylinder bore configured for transporting a part of the fodder, an electromagnetic radiation source configured for irradiating the part of the fodder transported by the screw by radiation with wavelengths longer than 780 nm, and a photonic sensor configured for detecting electromagnetic radiation transmitted through, reflected by or emitted by the part of the fodder
(Continued)

transported by the screw, and for outputting an output signal representing the detected electromagnetic radiation.

17 Claims, 3 Drawing Sheets

(56) References Cited

U.S. PATENT DOCUMENTS

| | | | |
|---|---|---|---|
| 2017/0188620 A1 | 7/2017 | Torres Aso et al. | |
| 2018/0160718 A1 * | 6/2018 | Liet | B01F 35/2205 |
| 2023/0413781 A1 * | 12/2023 | Kristensen | A01K 5/0275 |

FOREIGN PATENT DOCUMENTS

| | | | | |
|---|---|---|---|---|
| DE | 10236515 C1 | 9/2003 | | |
| EP | 0388082 A2 | 9/1990 | | |
| EP | 0427483 A1 | 5/1991 | | |
| EP | 1894461 A1 | 3/2008 | | |
| FR | 2490934 A1 * | 4/1982 | | B01F 35/212 |

OTHER PUBLICATIONS

Mostafa, et al., "Optimisation of dry matter and nutrients in feed rations through use of a near-infrared spectroscopy system mounted on a self-propelled feed mixer", Animal Production Science, vol. 61, No. 5, Nov. 18, 2020, pp. 514-524.

Office Action of Corresponding European Patent Application No. 21766474.7 dated May 9, 2025, 7 pages.

* cited by examiner

DEVICE FOR ESTIMATING AT LEAST ONE PROPERTY OF FODDER, A KIT, A CONTAINER COMPRISING THE DEVICE, AND A METHOD FOR ESTIMATING AT LEAST ONE PROPERTY OF FODDER

CROSS-REFERENCE TO RELATED APPLICATIONS

This application is the U.S. National Stage of PCT/EP2021/073519 filed on Aug. 25, 2021, which claims priority to European Patent Application 20192771.2 filed on Aug. 25, 2020, the entire content of both are incorporated herein by reference in their entirety.

FIELD OF THE INVENTION

The disclosure relates to determining the ingredients in fodder to be served to domesticated animals like e.g. cattle, sheep, and/or pigs.

BACKGROUND OF THE INVENTION

It is important that animals are given enough fodder to grow and stay healthy. However, the fodder need to have enough starch, protein, fat, vitamins, minerals etc. In the present disclosure, protein can be understood to mean crude protein. If the fodder lacks one important ingredient, the animals will either receive too little of that ingredient or eat unnecessarily much food that will lead to decreasing feed efficiency, decreasing nutrient utilization and cost the owner extra money without benefit. When mixing two different types of fodder, one fodder containing especially one type of ingredient, e.g. starch, and the other fodder containing especially another type of ingredient, e.g. protein, it is important that that the mixing is correct otherwise the animals will get too much starch and/or too little protein or vice versa. Especially in silage, the moisture can vary, even from 40% to 75%. The moisture can even vary within a bunker or stack. Since silage can be made from different types of crops e.g. grass, clover, maize, legumes etc., the ingredients can vary as well. Unfortunately, a device for correctly estimating moisture or ingredients in fodder is lacking, where the device has a sufficient precision and does not need to be calibrated at every single installation in the field, which takes a lot of time and resources. This means, that the farmer does not know exactly how much e.g. protein is given to the animals, and since too little protein can have negative impact on the growth of the animals, the farmer will estimate a little too much of protein to be on the safe side. However, too much protein is wasted money, and even worse leads to ammonia emissions, which are a main source of nitrogen pollution and have impact on biodiversity.

SUMMARY OF THE INVENTION

Considering the prior art described above, it is an object of the present disclosure to present a device that can be calibrated at the laboratory and where the device will be able to provide a correct estimations of the ingredients in the fodder even though the device is moved from one container to another one.

The object can be achieved by means of a device as disclosed herein.

It is well known that radiation transmitted through, reflected by or emitted by a material will carry information about the material so that different properties of the material can be determined. Near infrared (NIR) calibration models are optimized using spectra collected from the device in the laboratory or mounted on a box. Spectra are preprocessed e.g. by using first derivative and SNV (Standard Normal Variate) and calibration models optimized that correlate the properties of the fodder with preprocessed spectra using e.g. PLS (Partial Least Squares regression). Cross validation and test set validation is used to access the predictive power of the system.

The feeder may compress and/or structure the fodder so that air pockets are removed or more evenly dispersed giving the fodder a more homogenous distribution. Since the feeder transports fodder past the radiation from the radiation source, the detected radiation and the output signal may vary over time. However, the more homogenous distribution of fodder results in the detected radiation and the output signal to have less variation in time, which means a more reliable estimation of the property of the fodder.

The device can comprise a processing unit for analysing the data recorded by the photonic sensor. The processing unit can comprise a memory, where absorption spectra, transmission spectra, reflection spectra and/or fluorescence spectra (maybe including the excitation wavelength) of different relevant elements or molecules or materials are stored. The recorded data/spectrum can be compared to the stored data/spectra for characterising the fodder.

The radiation from the source may be in the range of near infrared (NIR) 0.75-1.4 μm, and/or short-wavelength infrared (SWIR) 1.4-3 μm, and/or mid-wavelength infrared (MWIR) 3-8 μm, and/or long-wavelength infrared (LWIR) 8-15 μm, and/or far infrared (FIR) 15-1000 μm.

Water absorption increases significantly at 1450 nm within the SWIR. By studying fodder at wavelength ranges of 950 to 1650 nm or 1100 to 1800 nm the amount of water can be determined.

The signal from the photonic sensor can be an analog signal like a voltage/current signal, wherein e.g. the variation in voltage or current amplitude or in the full width at half maximum (FWHM) represents the data.

The signal from the photonic sensor can be a digital signal. In that case the digital signal can be directly read by a processor or computer without an A/D-converter. If the signal is an analog signal, an A/D-converter can advantageously be inserted before the signal is received by a processor or computer.

The device may comprise a processing unit like e.g. a computer for processing the output signal received from the photonic sensor and for presenting the processed signal on a screen e.g. as a graph and/or as a number and/or an answer. The graph can be an absorption spectrum, a transmission spectrum, a reflection spectrum or a fluorescence spectrum. The number can be the absorption, the transmission, or the reflection in e.g. percentage of the full radiation from the radiation source. By calibrating the absorption to zero or the transmission to 100% when there is no fodder between the source and the sensor or by calibrating the reflection to 100% when an ideal mirror reflects the light from the source onto the sensor, a reliable quantification of the absorption, the transmission, and/or the reflection can be made. The absorption, the transmission, and the reflection of the radiation by the fodder can be an interaction of the radiation with the fodder.

The device can comprise a transmitter for transmitting data preferably wirelessly to an external computer or processor, where the data recorded by the sensor is analysed. The device can comprise a receiver for receiving instructions preferably wirelessly how and/or when to perform a measurement by the radiation source and the sensor. The transmitter and the receiver can be a mobile telephone, or the transmitter and the receiver configured for transmitting and the receiving data using a wireless LAN network, or a Bluetooth connection.

The external computer or processor can comprise the memory mentioned above, where the spectra are stored. An external memory will be advantageous, since the memory can be reached form many devices and updates of the memory like new spectra or spectra with better resolution do not need to be performed on each single device.

If the memory is large it will be advantageous to store the spectra at an external memory and not in a memory in the device.

The data recorded by the sensor can be analysed over time to see variations in the fodder from the producer of the fodder. The fall with generally wetter climate could possibly result in fodder with a higher water content. A higher water content will result in heavier fodder and if the animals are always given the same weight of fodder, the animals may receive too little starch, protein and fat when the fodder has a higher moisture/water content. By measuring using the photonic sensor e.g. the full width at half maximum (FWHM) and/or the peak amplitude at one or more wavelengths, where water absorbs radiation above 780 nm, to substances with different and known water contents the water content of fodder and the corresponding FWHM and/or peak amplitude at the one or more wavelengths can be calibrated, so that water content of a fodder with unknown water content can be determined by measuring the FWHM and/or peak amplitude at the one or more wavelengths.

It will be advantageous to measure the FWHM and/or peak amplitude at several wavelengths, since there can be peak overlap due to other elements or molecules. If then two peaks have the right mutual ratio regarding peak amplitude and/or FWHM, these two peaks can be used to determine the water content.

By storing e.g. in an external memory the measured data from the sensor, quality variations of the fodder can be detected. That knowledge could potentially help the fodder producer to produce better fodder or fodder with a more even level of quality.

The device may comprise a plotter that plots a graph representing the output signal e.g. in relation to time. The variation in time of one specific wavelength can then be studied. A mean value of the output signal can be calculated over time to increase the signal over noise ratio. If the wavelength or frequency vary with time e.g. by the radiation source scanning over a wavelength range, the plotted output signal will show the variation of transmission/reflection/emission through/by the fodder as a function of the wavelength from the radiation source.

The electromagnetic radiation source is configured for emitting radiation with wavelengths longer than 780 nm, or for emitting only radiation with wavelengths longer than 780 nm. If the electromagnetic radiation source emits radiation with wavelengths shorter than 780 nm in addition to the wavelengths longer than 780 nm a filter configured for absorbing and/or reflecting radiation with wavelengths shorter than 780 nm can be positioned between the electromagnetic radiation source and the fodder to be analysed.

The electromagnetic radiation source can be a broadband electromagnetic radiation source emitting radiation in a band at least 100 nm wide, preferably at least 200 nm wide, more preferably at least 300 nm wide and most preferably at least 500 nm wide, and the photonic sensor can be a broadband photonic sensor detecting radiation in a band at least 100 nm wide, preferably at least 200 nm wide, more preferably at least 300 nm wide and most preferably at least 500 nm wide, Such a broadband electromagnetic radiation source and a broadband photonic sensor will have the advantage that many excitation transitions can be measured simultaneously so that the content and even the percentage of e.g. water, protein and/or starch in the fodder can be reliably determined.

The feeder at least partially installed in the bore can be replaced by a piston, which moves into and out of the bore. In all embodiments relating to the feeder, the feeder can be replaced with the piston. The piston can transport the fodder into the bore. The piston and the bore for the piston can have any cross-sectional shape.

The feeder can be a press like a piston press, wherein the press is configured for pressing fodder into the bore, and wherein the sensor is configured for detecting electromagnetic radiation transmitted through, reflected by or emitted by the part of the fodder pressed by the press into the bore. This will be a good alternative to reliably determine the DMC as well as the starch, protein, fat and/or minerals.

The feeder and the bore can be replaced by a press and a wall, wherein the press is configured for pressing fodder against the wall, and wherein the sensor is configured for detecting electromagnetic radiation transmitted through, reflected by or emitted by the part of the fodder pressed by the press against the wall, preferably when the fodder is pressed against the wall by the press. The press will compress the fodder so that the measurements of the DMC in the fodder is reliable, as well as the measurements of the starch, protein, fat and/or minerals.

The radiation source and the sensor together can be a spectrometer, e.g. an infrared or a microwave spectrometer, or a near infrared (NIR) spectrometer or a far infrared (FIR) spectrometer for characterising the fodder.

In an embodiment, the feeder can be configured for compressing and/or rectifying the fodder when transporting the fodder into the bore. By compressing and/or rectifying the fodder the measured quantities of moisture or dry matter concentration (DMC) will be more reliable and will need less recalibration. This is true also when measuring the concentration of protein, starch, fat and minerals.

In an embodiment, the feeder can be a screw, and the bore can be a cylinder bore or a bore that is substantially cylindrical. Where the photonic sensor is mounted the bore might not be totally cylindrical. A screw transporting the fodder into a cylinder bore has turned out to yield very reliable determination of the moisture or DMC as well as the concentration of protein, starch, fat and minerals.

The screw may have a rotational speed of between 0.1 revolutions per second and 10 revolutions per second, preferably between 0.2 revolutions per second and 5 revolutions per second, most preferably between 0.5 revolutions per second and 2 revolutions per second. In these intervals of rotational speed, the fodder can be structured and/or compressed so that the measurement will be more consistent and reproducible from measurement to measurement.

In an embodiment, the device can comprise a dispersive element configured for spreading the electromagnetic radiation transmitted through, reflected by or emitted by the part of the fodder transported by the feeder or screw onto the photonic sensor.

The dispersive element like e.g. a prism or a diffraction grating can be configured for dispersing the radiation, which has interacted with the fodder, in different directions depending on the wavelengths. By rotating the dispersive element and/or the photonic sensor different wavelengths can irradiate the photonic sensor so variation in the interaction of the radiation with the fodder as a function of wavelength can be studied.

In an embodiment, the photonic sensor can be a 1-dimensional array or a 2-dimensional array of MOSFETs or other electromagnetic radiation sensitive sensors.

The dispersive element can disperse the radiation over the range of the 1-dimensional array of the MOSFETs or other electromagnetic radiation sensitive sensors so that the variation in the interaction of the radiation with the fodder as a function of wavelength can be recorded in one recording or one picture. There is no need to scan over a wavelength range and time is saved.

The dispersive element can disperse the radiation over the range of the 2-dimensional array of the MOSFETs or other electromagnetic radiation sensitive sensors. Sensors in a first direction of the 2-dimensional array will receive radiation with the same wavelength and sensors in a second direction perpendicular to the first direction of the 2-dimensional array will receive radiation with different wavelengths like the sensors of the 1-dimensional array sensors. The advantage of having sensors in the first direction receiving radiation with the same wavelength is that mean value from the sensors in the first direction can be calculated increasing the signal-to-noise ratio.

In an embodiment, the screw can have an outer diameter and the cylinder bore can have an inner diameter, wherein the inner diameter is between 1 mm and 50 mm or 2 mm and 50 mm, preferably between 2 mm and 40 mm or 5 mm and 40 mm, even more preferably between 3 mm and 20 mm, and most preferably between 4 mm and 8 mm larger than the outer diameter.

The fodder can be structured and/or compressed so that the measurement will be more consistent and reproducible from measurement to measurement. At the same time, there might be stones or gravel mixed with the fodder. The clearance between the diameter of the screw and the cylinder bore will allow the stones or gravel to pass the screw without the risk that a stone causes the screw to be stuck in relation to the cylinder bore. If the clearance is too large, the screw will not be able to transport any fodder or too little of the fodder.

In an embodiment, the screw can have an outer diameter of between 25 mm and 200 mm, preferably between 50 mm and 150 mm, even more preferably between 60 mm and 125 mm, and most preferably between 70 mm and 100 mm.

In an embodiment, the screw can have a helical ridge with a pitch of between 25 mm and 250 mm, preferably between 50 mm and 200 mm, even more preferably between 60 mm and 150 mm, and most preferably between 70 mm and 125 mm.

In an embodiment, the helical ridge can have between 1 and 10, preferably between 2 and 9, even more preferably between 3 and 8, and most preferably between 4 and 7 turns around the screw.

In an embodiment, the screw can define an outer diameter and a pitch, wherein the ratio of the pitch and the outer diameter can be equal to or less than 1.

The pitch of the screw is the distance along the longitudinal direction of the screw between two points on the helical ridge separated by one whole revolution.

Since in one embodiment, the cylinder bore and the screw inside the cylinder bore are configured for being positioned below a container for mixing fodder, so that mixed fodder is constantly falling down into an inlet of the cylinder bore and is being packed in the cylinder bore by the weight of the fodder in the container, the cylinder bore during operation of the screw will be filled up so that the mixed fodder in the cylinder bore may yield a lot of resistance when being moved by the screw, and driving the screw may need a lot of power. For that reason, a ratio between the pitch and the outer diameter equal to or less than 1 will yield the necessary force on the mixed fodder without wearing out bearings, fittings of the screw and motion transfers between the driving source and the screw, or without the need for a powerful, expensive and/or bulky motor. Alternatively or in addition, the pitch can be progressive when going from the inlet of the screw to the outlet, so that distance between the ridge increases along the screw to avoid packing of the mixed fodder at the end of the screw. The benefit will be the same as mentioned above for the screw with the ratio of the pitch and the outer diameter being equal to or less than 1.

In an embodiment, the cylinder bore can have a window that is transparent to at least some wavelengths longer than 780 nm.

The window gives access for the electromagnetic radiation source to irradiate the fodder inside the cylinder bore, and for the photonic sensor to detect the radiation that has interacted with the fodder without any fodder coming out of the cylinder bore through the window.

In an embodiment, the photonic sensor can be positioned at the window on the outside of the cylinder bore.

With the sensor positioned at the window on the outside of the cylinder bore, the sensor will not be exposed to the dust or moisture from the fodder.

In an embodiment, the cylinder bore can have two openings.

The cylinder bore can have a first opening for receiving the fodder and a second opening, where the fodder exits the cylinder bore. The two openings allow new fodder to be continuously analysed and the measurement by the photonic sensor can continue until the interaction of the radiation with the fodder stabilises, preferably within a predetermined level.

In an embodiment, the cylinder bore can have a first end and a second end, and wherein the screw is positioned in the first end and the second end has an aperture.

The aperture at the outlet of the cylinder bore will increase the compression of the fodder in the cylinder bore and there will be less air pockets in the fodder. The fewer or smaller air pockets means that the measurements of the fodder will vary less with time and be more reproducible. With a window in the cylinder bore, the fodder will be closer to the window and the variation in the measured signal will vary less with time as well.

In an embodiment, the aperture can be removably connected at the second end.

That the aperture is removably connected means that the aperture can be replaced by another aperture with a smaller opening or a larger opening. If the measurements of the fodder vary too much with time an aperture with a smaller opening can be beneficial, while an aperture with a larger opening will be beneficial if the two apertures both give good reproducible results, since the smaller aperture will cause the feeder or screw to work harder.

In an embodiment, the feeder can be hydraulically operated by a hydraulic fluid. Tractors normally have a power take-off (PTO) and a hydraulic fluid power outlet. The PTO provides a rotating shaft driven by the engine of the tractor. The PTO can drive an external hydraulic pump that will provide hydraulic power to operate the feeder. The hydraulic fluid power outlet can comprise an outlet and an inlet so that the engine of the tractor can pump hydraulic fluid for driving the hydraulically operated feeder by a hydraulic circuit.

The device may be used by farmers. That the feeder can be hydraulically operated means that a tractor can provide the means for driving the feeder almost anywhere, since the tractor is able to go almost anywhere.

In an embodiment, the device can comprise a hydraulic bypass valve for bypassing the feeder. In an open position, the hydraulic bypass valve will let the hydraulic fluid to circulate in the circuit without operating the feeder, while in a closed position, the hydraulic bypass valve will guide the hydraulic fluid to circulate in the circuit through the feeder and operating the feeder. Therefore, the feeder is switched on and off by controlling the hydraulic bypass valve, while the hydraulic fluid can be circulated all the time. The hydraulic power provided e.g. by a tractor can run continuously, while the operation of the feeder can be controlled by controlling the hydraulic bypass valve. That means that the operation of the hydraulic fluid inside e.g. the tractor does not need to be switched on and off for controlling the feeder. The provider, e.g. the tractor, of the hydraulic power does not need to be rebuilt or changed to be able to switch the feeder on and off, but the device can comprise the valve for controlling the feeder.

In an embodiment, the device can comprise a processing unit connected to the photonic sensor configured for measuring the content of dry matter, starch, protein, fat, and/or one or more minerals of the fodder, wherein the processing unit can be configured for receiving the output signal about the content of dry matter, starch, protein, fat, and/or one or more minerals of the fodder, and being connected to a scale for receiving weight data of the weight of the fodder in a container, and for calculating dry weight of the fodder measured by the scale, and/or percentage of starch, protein, fat, and/or one or more minerals of the fodder measured by the scale.

In an embodiment, the device can comprise an input unit configured for receiving input data about the fodder to be served to animals, and wherein the processing unit can be configured for activating at least a first feeder and a second feeder, wherein activation of the first feeder allows entrance of a first fodder and activation of the second feeder allows entrance of a second fodder into the container.

The disclosure also relates to a kit comprising the screw, the cylinder bore, the electromagnetic radiation source, and the photonic sensor as disclosed herein.

The disclosure also relates to a container for carrying fodder, the container comprising the device as described above.

The cylinder bore comprising the screw connected to the container can continuously analyse the fodder in the container to show whether the fodder comprises the right amounts of moisture or of dry matter, starch, protein, fat, etc. Especially, when mixing two or more different types of fodder, the one fodder contributing with e.g. starch and the other fodder contributing with e.g. protein it is important to find out that the mix is the correct mixture of the two or more different types of fodder.

In an embodiment, the container can comprise at least one mixer configured for mixing the fodder.

The mixer will mix e.g. two or more different types of fodder so that the two or more different types of fodder are evenly distributed. By adding the device presented above to the container having the mixer, the fodder can be mixed simultaneously as the relative and/or absolute amounts of ingredients in the mixed fodder like e.g. starch, protein, fat, etc. is determined. This will save time since the mixture and the analysis are performed at the same time. No extra bulky machine is needed that will save space in the garage of the farmer.

In an embodiment, the container can comprise a scale for estimating the weight of fodder in the container.

By being able to estimating the weight of fodder in the container the total amount of the ingredients of the fodder can be calculated and will be easy to find out if there is enough fodder and enough e.g. starch, protein, fat for the number of animals to be fed.

In an embodiment, the device may comprise a processing unit connected to the photonic sensor configured for measuring the content of water, starch, protein, fat, and/or one or more minerals of the fodder, wherein the processing unit can be configured for receiving the output signal about the content of water, starch, protein, fat, and/or one or more minerals of the fodder, and wherein the processing unit can be configured for being connected to a scale for receiving weight data of the weight of the fodder in a container, and for calculating dry weight of the fodder measured by the scale, and/or percentage of starch, protein, fat, and/or one or more minerals of the fodder measured by the scale.

The scale can be positioned under the container for weighing the fodder in the container. Alternatively, the loader used for loading the fodder into the container may comprise a scale, which can weigh the load in the loader. The fodder in the loader about to be added to the container can be weighed and the information sent from the loader to the processing unit. The processing unit will add the weight of the fodder in the loader about to be added to the container to the weight already in the container.

In an embodiment, the device may comprise an input unit configured for receiving input data about the fodder to be served to animals, and wherein the processing unit can be configured for activating at least a first feeder and a second feeder, wherein activation of the first feeder may allow entrance of a first fodder and activation of the second feeder allows entrance of a second fodder into the container.

The input data can be put in by an operator. The advantage of this embodiment is that the processing unit by receiving weight data about the weight of the fodder in the container and/or about the content of water, starch, protein, fat, and/or one or more minerals of the fodder can control the first and second feeders so that the mixed fodder in the container has the dry weight requested by the operator with the correct amount of starch, protein, fat, and/or one or more minerals. The first and second fodder have to be arranged so that the first and second fodder will enter the container when the first feeder and the second feeder is/are activated, which can be done by utilising the gravity, vacuum for sucking the first and second fodders or by blowing the first and second fodders.

In an embodiment, the device may comprise a processing unit connected to a scale for measuring the weight of the fodder in the container, wherein photonic sensor may also be connected to the processing unit so that the processing unit can receive information about the weight of fodder in the container and e.g. the water content, the starch content, the protein content, the fat content, and/or the content of one or more minerals of the fodder.

In an embodiment, the feeder and the bore can be positioned below the container. Fodder or mixed fodder will then automatically fall down into the bore when fodder already in the bore is transported by the feeder passed the electromagnetic radiation source and the photonic sensor and out of the bore.

The disclosure also relates to a method for estimating at least one property of fodder, the method comprising:

compressing and/or structuring fodder, irradiating the compressed and/or structured fodder by radiation with wavelengths longer than 780 nm, detecting radiation transmitted through, reflected by or emitted by the compressed and/or structured fodder, and analysing a signal representing the detected radiation for estimating the at least one property of fodder.

Compressing the fodder can mean that at least some air pockets in the fodder are reduced in size.

Structuring the fodder can mean to give structure to the fodder like e.g. aligning the fodder and/or curling the fodder and/or cutting the fodder at a certain length.

Using the present method, the amount of starch, protein and/or fat in the fodder can reliably be determined. This present method will have all the advantages as presented regarding to the device above.

In an embodiment, the at least one property can be percentage of water in the fodder.

The amount of water in the fodder will influence the weight of the fodder. If a first batch of fodder contains a lot of water while a second batch of the otherwise same fodder contains relatively little water, and the animals are given the same weight of fodder, the animals will receive more starch, protein, fat, if the animals are given fodder from the second batch. For that reason, it is advantageous to know the water content so that the animals are given the right amount of fodder.

If the animals are given a mix of two different types of fodder, where the one of the two different types of fodder contains e.g. more starch and less protein than the other of the two different types of fodder, it is advantageous to know the water content in each of the two different types of fodder so that the animals are given the right amount (not too much and not too little) of starch and protein.

BRIEF DESCRIPTION OF THE DRAWINGS

The disclosure will in the following be described in greater detail with reference to the accompanying drawings.

DETAILED DESCRIPTION OF THE INVENTION

Figure 1:
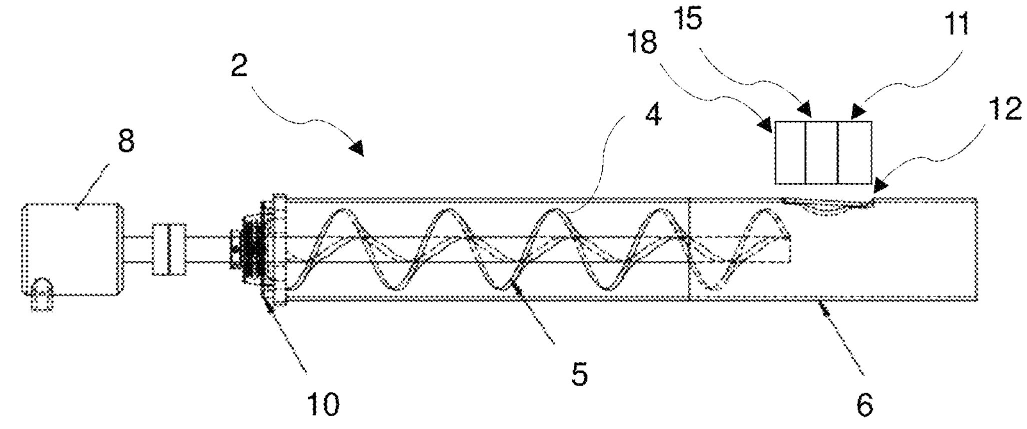
FIG. 1 is a schematic view of a screw positioned in a cylinder bore.
Figure 2:
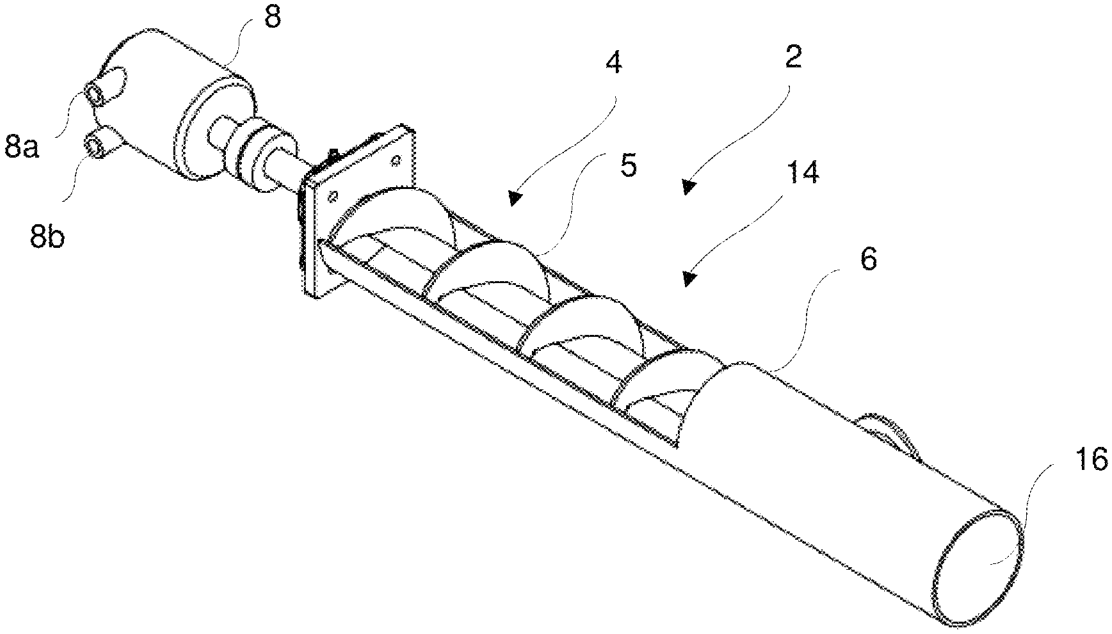
FIG. 2 is a schematic view of the screw and the cylinder bore from another angle.

FIGS. 1 and 2 show a structuring and/or a compressing device 2 in the form of a screw 4 with a helical ridge 5 positioned in a cylinder bore 6. The screw is rotated in the cylinder bore by a motor 8 preferably a hydraulic motor, since hydraulic power is nearly always provided by a modern tractor. The motor 8 has as shown in FIG. 2 an inlet 8*a* and an outlet 8*b* for the driving hydraulic fluid e.g. from the tractor.

The device comprises a bearing 10 for reducing friction between the rotating screw 4 and the stationary cylinder bore 6. The cylinder bore 6 has a window 12 at least substantially transparent for at least one wavelength range above 780 nm for allowing access for a radiation source 11 and a sensor 15 to the fodder inside of the cylinder bore for studying and characterising the fodder. The window 12 is preferably made of sapphire glass. In an embodiment, the device can comprise a processing unit 18 connected to the photonic sensor 15 configured for measuring the content of dry matter, starch, protein, fat, and/or one or more minerals of the fodder.

FIG. 2 shows that the cylinder bore 6 has a first opening 14 for receiving fodder into the cylinder bore so that the fodder can be transported by the screw 4 towards and out of a second opening 16.

The window 12 is preferably positioned close to the second opening 16. If the screw 4 is made shorter than the cylinder bore 6 so that the last fourth of the cylinder bore does not have the screw, as shown in FIGS. 1 and 2, the helical ridge 5 will not influence the measurements by the sensor 15. If the screw extends past the window, the sensor 15 can be triggered by the rotation of the screw to measure and characterise the fodder when the helical ridge is at least partly not blocking the window.

That the window 12 is positioned within the last fourth of the cylinder bore with or without the screw extending past the window has the advantage that the fodder has been treated by the screw so that the result measured by the sensor 15 is independent by time (does not vary with time) as long as the fodder is the same.

As shown in FIGS. 1 and 2, the window 12 is positioned on the side of the cylinder bore 6 and not on top of the cylinder bore 6. The advantage is that there will not be an air pocket between the window and the fodder. The window could of course also be positioned in any position on the lower half of the cylinder bore.

For measuring transmission or absorption a second window (not shown) would preferably be positioned on the cylinder bore opposite the window 12, where the second window can have all the feature of the window 12. To avoid that the signal from the radiation source 11 is not totally absorbed before the signal reaches the sensor 15, the end of the cylinder bore can be made bore narrow so that the distance between the window 12 and the second window is reduced. How much the distance between the window 12 and the second window may be reduced will depend on the fodder and the wavelength(s) studied. At the part of the cylinder bore, where the cylinder bore is narrowed there cannot be a screw, unless the cylinder bore as well as the screw are tapered.

Figure 3:
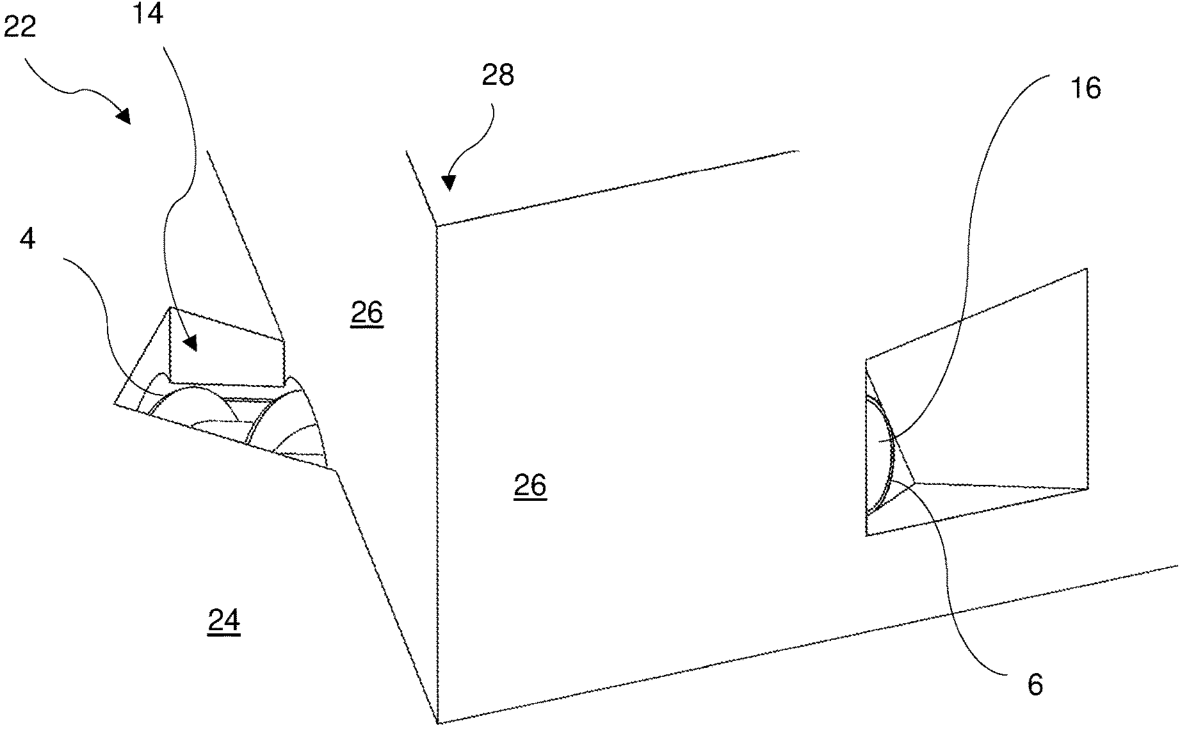
FIG. 3 is a schematic view of the cylinder bore and the screw positioned in a container.

FIG. 3 shows a container 22 with a floor 24 and walls 26. FIG. 3 shows the container 22 from the inside, where the container 22 has an inner corner 28 forming an indentation in the container 22. FIG. 3 shows the screw 4 in the cylinder bore 6, where the cylinder bore is connected to the container 22. The cylinder bore is arranged so that the first opening 14 is an opening in the floor 24 so that fodder will always fill the cylinder bore under the first opening. The second opening 16 is arranged in one of the walls 26. The second opening 16 could also be arranged in the floor 24. In both situations the fodder transported by the screw through the second opening into the container 22.

EXAMPLES

First Example

In a first example, 4000 kg of corn silage and 6000 kg of grass silage are to be mixed and served to the cattle in a stable. The weights given are for the dry matter of the corn silage and of grass silage. The corn silage contains a lot of starch and the grass silage has a high percentage of protein.

Other complementary types of fodder can also be contemplated within the context of the present disclosure. With complementary types of fodder is meant that compositions regarding nutrition like especially starch, fat and protein of the two or more complementary types of fodder are such that an ideal compositions of nutrition can be achieved for a type of animal when the types of fodder are mixed together in a certain mixture. If all three of starch, fat and protein are to served to the animals at certain concentrations, it will be advantageous to mix three types of preferably complementary fodder—if we have three equations we should have three unknowns.

First, something like 80% by weight of 6000 kg or 4800 kg of the grass silage is poured into a container with an assumed dry matter concentration (DMC) of e.g. 35%, which means a weight of grass silage including the moisture of around 14000 kg. (The number given is just an example. Other starting amounts are also possible.) A machine like a loader for filling the container can have a scale for weighing the grass silage before the corn is poured into the container or the container itself has a scale for weighing the grass silage after the grass silage has been poured into the container. The container comprises a feeder that transfers at least part of the fodder into a bore. The container also comprises an electromagnetic radiation source and a photonic sensor so that the fodder in the bore can be analysed. The feeder can be a screw and the bore can be a cylindrical bore.

Figure 4A:
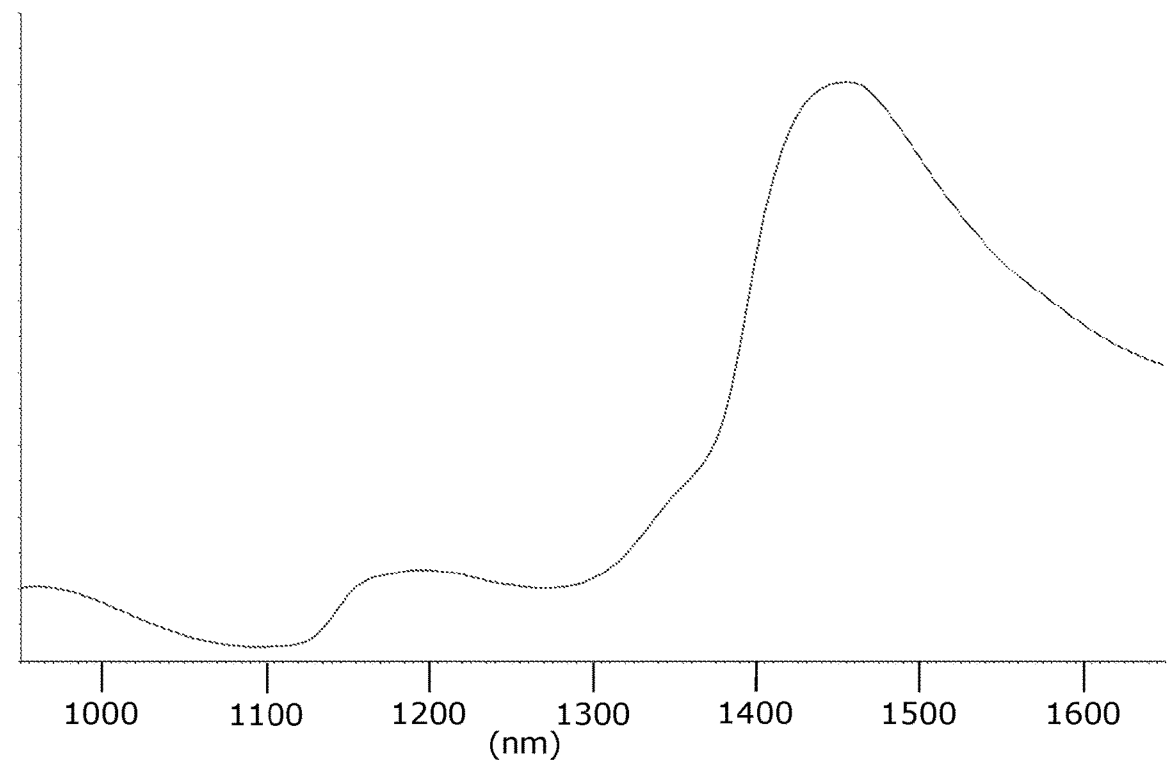
Figure 4B:
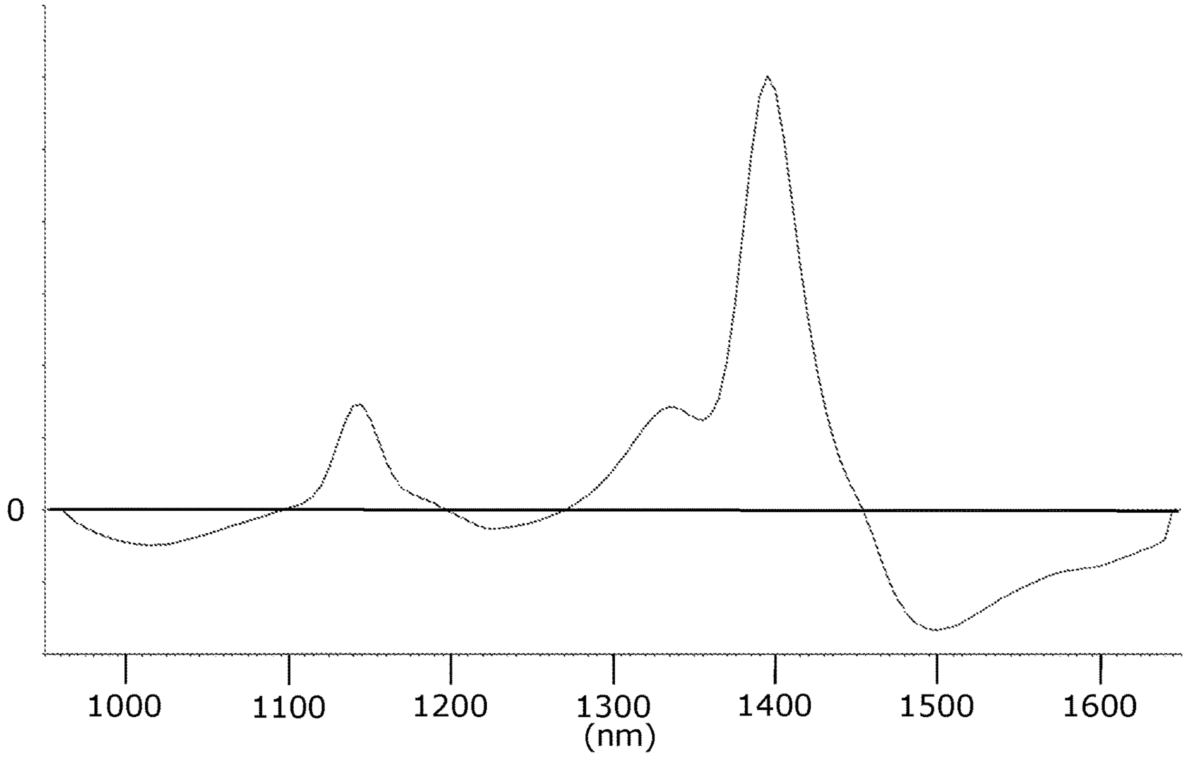

A spectrum showing the measured absorbance of the fodder is shown in FIG. 4*a*. Water absorbs in the ranges 960-980 nm and 1410-1440 nm in the shown range. Other molecules absorb in the shown range and some molecules absorb also in the ranges, where water absorbs. Therefore it is an advantage to cover two ranges, where water absorbs, since the ratio of the absorbance of the two ranges are fixed for water, and contributions from other molecules can be eliminated. Alternatively, the analysis about the amount of water and thus the concentration of water in the fodder can be based on the first derivative of the absorbance, which is shown in FIG. 4*b*. The first derivative of the absorbance will generally provide a more reliable calculation about the water content. Based on e.g. PLS (Partial Least Squares regression) or another regression method like e.g. PCR (Principal Component Regression), the water content in the fodder can be extracted from the absorbance and with a higher precision from the first derivative of the absorbance.

Based on the absorbance of (or detected radiation transmitted through, reflected by or emitted by) the fodder in the bore the DMC of the grass silage is determined. If the water content is determined to be e.g. 60% in the fodder, the DMC is then 40% in the fodder. If the measured data from the photonic sensor indicate that the DMC in the grass silage is 30% by weight, the weight of dry matter of the silage is 4200 kg and not as assumed 4800 kg. By mixing the grass silage in the container by a mixer and measuring the DMC in the grass silage, maybe continuously, more grass silage can be poured into the container until the dry matter of grass silage is 6000 kg. The total weight with the DMC in the grass silage being 30% by weight is then 20000 kg.

A processing unit receiving the signal from the photonic sensor can continuously calculate the water content in the grass silage. If the processing unit also receives data about the weight of the grass silage in the container from the scale of the container, the dry matter weight of the grass silage can continuously be calculated. The dry matter weight of the grass silage can advantageously be presented on a display on the outside of the container or sent wirelessly to e.g. a smart phone of the driver of the loader so that the driver always knows how much of grass silage there is in the container and how much more has to be poured into the container.

Then something like 80% by weight of 4000 kg or 3200 kg of corn silage is poured into the container with an assumed DMC of e.g. 25%, which means a weight of corn silage including the moisture of around 12800 kg.

If the DMC of the corn silage and the DMC of the grass silage differ from each other, the water content measured by the photonic sensor will vary until the mixture is homogenous. This will be a good indicator whether two or more fodders are homogenously mixed so that each animal receives the intended mixture. If the DMC of the corn silage and the DMC of the grass silage is essentially the same, the operator will have to let the fodder mix for a certain time. An operator, who knows the container and the mixer will know how long time that is needed to achieve a well-mixed fodder.

Before the corn silage and the grass silage are well mixed it is difficult to determine the DMC of the corn silage. Since we know the weight and the DMC of the grass silage we can easily calculate the water/moisture content and the DMC of the corn ensilage when we know the weight and the water/moisture content of the mixture. If the photonic sensor measures DMC of 28% by weight (72% moisture) of the mixture and the total weight is 20000 kg of grass silage including moisture and 12800 kg of corn silage including the moisture, we have an equation about the DMC as $$i.0.3*20000\text{ kg}+x*12800\text{ kg}=0.28*(20000+12800)\text{ kg},$$

where x can be determined to be 0.249 so that the DMC of the corn ensilage is 24.9% or 25% by weight, which in this case was the assumed DMC. Based on that information, if the total amount of dry matter of corn ensilage is supposed to be 4000 kg, the weight of the added corn ensilage including moisture will be 16000 kg so that a further 3200 kg of corn silage has to be added to the container (16000 kg-12800 kg).

Alternatively, the 6000 kg of grass silage and the 4000 kg of corn silage to be given to the cattle in this example could be with a certain DMC, like e.g. with 35% by weight, so that the weight of the dry matter of grass silage would be 2100 kg and of corn silage would be 1400 kg. With the data from the photonic sensor indicating the DMC is 30% by weight of the 4800 kg (80% of the 6000 kg), as in this example, that corresponds to 1440 kg dry matter, and another 660 kg of dry matter of grass silage or 2200 kg of grass silage with 70% moisture/30% DMC would have to be added. The container is filled up with the grass silage at the observed DMC. If the weight of the grass silage was intended to be 6000 kg with 35% DM and DM was determined to be 30% by weight, the total weight of the silage to be loaded will be 7000 kg.

Of course, when stored the surface of the grass ensilage can vary so that grass ensilage closer to the surface of the stored grass ensilage has another water content compared to the grass ensilage further away from the surface. This can be true for corn silage, too. For this reason, it will be a good idea to continuously measure the water content of the mixture.

In addition to fat, starch and protein, the animals may need minerals like e.g. calcium, phosphorus, potassium and salt. If these minerals also need to achieve certain limits, more than two different types of fodder should be mixed. The calculations of how large quantities of each type of fodder to achieve these limits without exceeding the limits too much can easily be done by a processing unit.

Second Example

In a second example, 10000 kg of dry matter of a mixture of corn silage and of grass silage are to be mixed and served to the cattle in a stable. The corn silage contains a lot of starch and the grass silage has a high percentage of protein. The operator does not know the exact percentage of fat, protein and starch of the corn silage and especially of the grass silage, but the operator knows that the mixture to be served should have 16% by weight crude protein of the dry fodder and 20% by weight starch of dry fodder. The photonic sensor can interchangeably measure the water content, the protein content and the starch content in the fodder in the container and present the protein content of dry fodder and the starch content of dry fodder together with the weight of the dry fodder in the container measured by a scale on a display visible to the operator for guiding the operator how much of the corn silage and of the grass silage to further add to the container.

The moisture of each of the corn silage and of grass silage has to be determined as in example 1 so that the right amount of dry matter can be given the animal.

Corn silage may turn out to have 10% by weight of crude protein and 35% by weight of starch, while grass silage mixed with clover may turn out to have 15% by weight of crude protein and 1% by weight of starch. With this mixture of corn silage and grass silage we cannot reach the 16% by weight crude protein, and it will be beneficial to add e.g. soybean meal as a third ingredient, since soybean meal may turn out to have 52% by weight of crude protein and 3% by weight of starch. The DMC of soybean meal will also have to be determined.

Third Example

In an alternative to the second example, the device comprises a processing unit connected to the scale for receiving data about the weight of the fodder in the container, connected to an input unit for receiving from the operator data about the starch, protein, fat, one or more minerals, and/or dry weight of the fodder to be served to the animals, connected to the photonic sensor for receiving data, preferably continuously, about content of the starch, protein, fat, one or more minerals, and/or dry weight of the fodder, and connected to at least a first feeder and a second feeder for controlling the first feeder and the second feeder, wherein activation of the first feeder and the second feeder allows entrance of the corn silage and of the grass silage, respectively.

When the data about the fodder to be served to the animals have been received from the operator through the input unit, the processing unit activates the first feeder so that corn silage can enter the container. The photonic sensor measures the DM, starch, protein, fat, and/or one or more minerals of the corn silage and sends the measured data to the processing unit. The processing unit activates the second feeder so that grass silage can enter the container. The photonic sensor measures the DM, starch, protein, fat, and/or one or more minerals of the mixture of corn silage and grass silage and sends the measured data to the processing unit. Since the DM, starch, protein, fat, and/or one or more minerals of the corn silage has/have already been determined, the DM, the starch, protein, fat, and/or one or more minerals, of the grass silage can now be determined.

Since the DM of the corn silage and of the grass silage have now been determined, the dry weight of the corn silage and of the grass silage can also be determined. The processing unit can control the first and second feeders to fill up the container to the desired dry weight of fodder with the percentage of starch, protein, fat, and/or one or more minerals as indicated by the operator.

The invention claimed is:

1. A container for carrying fodder, the container comprising:

a device for estimating at least one property of fodder, the device comprising:

a feeder configured for transporting a part of the fodder into a bore and through the bore from a first opening of the bore to a second opening of the bore;

an electromagnetic radiation source configured for irradiating the part of the fodder transported into and through the bore by the feeder by radiation with wavelengths longer than 780 nm;

a photonic sensor configured for detecting electromagnetic radiation transmitted through, reflected by or emitted by the part of the fodder transported in the bore by the feeder, and for outputting an output signal representing the detected electromagnetic radiation; and a processing unit configured for calculating at least one property of the fodder based on the output signal.

2. The container according to claim 1, wherein the container comprises at least one mixer configured for mixing the fodder.

3. The container according to claim 1, wherein the container comprises a scale for estimating the weight of fodder in the container.

4. The container according to claim 1, wherein the feeder and the bore are positioned below the container.

5. The container according to claim 1, wherein the bore has a window that is transparent to at least some wavelengths longer than 780 nm.

6. The container according to claim 5, wherein the photonic sensor is positioned at the window on the outside of the bore.

7. The container according to claim 1, wherein the feeder is hydraulically operated by a hydraulic fluid.

8. The container according to claim 1, wherein the device comprises the processing unit connected to the photonic sensor configured for measuring the content of dry matter, starch, protein, fat, and/or one or more minerals of the fodder, wherein the processing unit is configured for:

receiving the output signal about the content of dry matter, starch, protein, fat, and/or one or more minerals of the fodder; and being connected to a scale for receiving weight data of the weight of the fodder in a container; and for calculating dry weight of the fodder measured by the scale; and/or percentage of starch, protein, fat, and/or one or more minerals of the fodder measured by the scale.

9. The container according to claim 8, wherein the device comprises an input unit configured for receiving input data about the fodder to be served to animals, and wherein the processing unit is configured for activating at least a first feeder and a second feeder, wherein activation of the first feeder allows entrance of a first fodder and activation of the second feeder allows entrance of a second fodder into the container.

10. A method for estimating at least one property of fodder, the method comprising:

compressing and/or structuring fodder;

transporting a part of the compressed and/or structured fodder into a bore and through the bore from a first opening of the bore to a second opening of the bore;

irradiating the compressed and/or structured fodder in the bore by radiation with wavelengths longer than 780 nm;

detecting radiation transmitted through, reflected by or emitted by the compressed and/or structured fodder in the bore; and analysing an output signal representing the detected radiation for estimating the at least one property of the compressed and/or structured fodder in the bore.

11. The method according to claim 10, wherein the at least one property is percentage of water in the fodder.

12. The method according to claim 10, wherein the step(s) of compressing and/or structuring the fodder, and/or irradiating the fodder, and/or detecting the radiation and/or analysing the output signal is/are performed using the device comprising:

a feeder configured for transporting a part of the fodder into and through the bore;

an electromagnetic radiation source configured for irradiating the part of the fodder transported in the bore by the feeder by radiation with wavelengths longer than 780 nm;

a photonic sensor configured for detecting electromagnetic radiation transmitted through, reflected by or emitted by the part of the fodder transported in the bore by the feeder, and for outputting an output signal representing the detected electromagnetic radiation; and a processing unit configured for calculating at least one property of the fodder based on the output signal.

13. The container according to claim 1, wherein the feeder is a screw, and wherein the bore is a cylinder bore.

14. The container according to claim 13, wherein the screw has an outer diameter and the cylinder bore has an inner diameter, wherein the inner diameter is between 1 mm and 50 mm, or between 2 mm and 30 mm, or between 3 mm and 15 mm, or between 4 mm and 8 mm larger than the outer diameter.

15. The container according to claim 13, wherein the screw has an outer diameter and a pitch and wherein the ratio of the pitch to the outer diameter is equal to or less than 1.

16. The container according to claim 13, wherein the screw extends into the cylinder bore.

17. The container according to claim 16, wherein the bore has a window that is transparent to at least some wavelengths longer than 780 nm and the window is spaced from the screw along the bore such that a helical ridge of the screw will not influence the measurements by the photonic sensor.

* * * * *